United States Patent
Song et al.

(10) Patent No.: US 11,594,750 B2
(45) Date of Patent: Feb. 28, 2023

(54) METHODS AND SYSTEMS FOR REDOX FLOW BATTERY ELECTROLYTE HYDRATION

(71) Applicant: ESS TECH, INC., Wilsonville, OR (US)

(72) Inventors: Yang Song, West Linn, OR (US); Kenneth Kiyoshi Fisher, Portland, OR (US); Timothy McDonald, Portland, OR (US)

(73) Assignee: ESS TECH, INC., Wilsonville, OR (US)

( * ) Notice: Subject to any disclaimer, the term of this patent is extended or adjusted under 35 U.S.C. 154(b) by 676 days.

(21) Appl. No.: 15/965,671

(22) Filed: Apr. 27, 2018

(65) Prior Publication Data

US 2018/0316036 A1    Nov. 1, 2018

Related U.S. Application Data

(60) Provisional application No. 62/491,970, filed on Apr. 28, 2017.

(51) Int. Cl.
*H01M 8/18* (2006.01)
*H01M 8/04276* (2016.01)
*H01M 8/04119* (2016.01)
*H01M 4/86* (2006.01)
(Continued)

(52) U.S. Cl.
CPC ............ *H01M 8/188* (2013.01); *H01M 4/86* (2013.01); *H01M 8/04119* (2013.01); *H01M 8/04225* (2016.02); *H01M 8/04283* (2013.01); *H01M 50/60* (2021.01); *H01M 2004/8684* (2013.01);
(Continued)

(58) Field of Classification Search
CPC .................................................... H01M 8/188
See application file for complete search history.

(56) References Cited

U.S. PATENT DOCUMENTS

| 6,692,862 B1 | 2/2004 | Zocchi |
| 7,800,345 B2 | 9/2010 | Yun et al. |
| 9,509,011 B2 | 11/2016 | Evans et al. |

(Continued)

FOREIGN PATENT DOCUMENTS

| WO | 2013027076 A1 | 2/2013 |
| WO | 2016117265 A1 | 7/2016 |

(Continued)

OTHER PUBLICATIONS

Song, Y. et al., "Methods and System for a Battery," U.S. Appl. No. 15/965,673, filed Apr. 27, 2018, 66 pages.
(Continued)

*Primary Examiner* — Nathanael T Zemui
(74) *Attorney, Agent, or Firm* — McCoy Russell LLP

(57) ABSTRACT

Methods and systems are provided for transporting and hydrating a redox flow battery system with a portable field hydration system. In one example, the redox flow battery system may be hydrated with the portable field hydration system in a dry state, in the absence of liquids. In this way, a redox flow battery system may be assembled and transported from a battery manufacturing facility to an end-use location off-site while the redox flow battery system is in the dry state, thereby reducing shipping costs, design complexities, as well as logistical and environmental concerns.

16 Claims, 6 Drawing Sheets

(51) Int. Cl.
*H01M 8/04225* (2016.01)
*H01M 50/60* (2021.01)
(52) U.S. Cl.
CPC ...... *H01M 2004/8689* (2013.01); *Y02E 60/50* (2013.01)

(56) References Cited

U.S. PATENT DOCUMENTS

| | | | | |
|---|---|---|---|---|
| 2003/0072981 A1* | 4/2003 | Imaseki | ............ | H01M 8/04029 429/434 |
| 2008/0241643 A1* | 10/2008 | Lepp | ................ | H01M 8/04753 429/61 |
| 2010/0092813 A1* | 4/2010 | Sahu | ................... | H01M 8/0432 429/409 |
| 2014/0363747 A1* | 12/2014 | Evans | ................ | H01M 8/0693 429/409 |
| 2015/0255824 A1* | 9/2015 | Evans | ................... | H01M 8/184 429/418 |
| 2016/0006054 A1 | 1/2016 | Li et al. | | |
| 2016/0093925 A1 | 3/2016 | Li et al. | | |
| 2016/0293992 A1 | 10/2016 | Song et al. | | |
| 2019/0237781 A1* | 8/2019 | Ikeuchi | ................. | H01M 8/188 |

FOREIGN PATENT DOCUMENTS

| WO | WO-2017035257 A1 * | 3/2017 | ............ H01M 12/04 |
|---|---|---|---|
| WO | 2018201070 A1 | 11/2018 | |

OTHER PUBLICATIONS

Song, Y. et al., "Methods and Systems for Operating a Redox Flow Battery System," U.S. Appl. No. 15/965,709, filed Apr. 27, 2018, 44 pages.

Evans, C., "Methods and Systems for Rebalancing Electrolytes for a Redox Flow Battery System," U.S. Appl. No. 15/965,728, filed Apr. 27, 2018, 50 pages.

Song, Y. et al., "Integrated Hydrogen Recycle System Using Pressurized Multichamber Tank," U.S. Appl. No. 15/965,627, filed Apr. 27, 2018, 50 pages.

Song, Y. et al., "Flow Battery Cleansing Cycle to Maintain Electrolyte Health and System Performance," U.S. Appl. No. 15/965,722, filed Apr. 27, 2018, 56 pages.

"ESS Technical White Paper: All-Iron Flow Battery- Overview," ESS Inc. Website, Available Online at https://www.essinc.com/wp-content/uploads/2016/08/ESS-Technical-White-Paper-August-2016.pdf, Aug. 2016, 5 pages.

Wild, E., "Installation Notes: Microgrid reduces California winery's carbon footprint," Solar Power World Website, Available Online at https://www.solarpowerworldonline.com/2016/08/installation-notes-microgrid-reduces-california-winerys-carbon-footprint/, Aug. 18, 2016, 2 pages.

Crompton, P., "US military to test mission critical ability of dry deployment flow battery," Energy Storage Publishing Website, Available Online at https://www.bestmag.co.uk/content/us-military-test-mission-critical-ability-dry-deployment-/low-battery, Nov. 25, 2016, 1 page.

Wood, E., "The Life and Death Value of Energy Storage in Military Microgrids," Microgrid Knowledge Website, Available Online at https://microgridknowledge.com/military-microgrids-ess/, Jan. 10, 2017, 2 pages.

ISA Korean Intellectual Property Office, International Search Report Issued in Application No. PCT/US2018/030009, dated Aug. 27, 2018, WIPO, 3 pages.

European Patent Office, Extended European Search Report Issued in Application No. 18790266.3, dated Dec. 15, 2020, Germany, 7 pages.

* cited by examiner

METHODS AND SYSTEMS FOR REDOX FLOW BATTERY ELECTROLYTE HYDRATION

CROSS REFERENCE TO RELATED APPLICATIONS

The present application claims priority to U.S. Provisional Application No. 62/491,970, entitled "Methods and Systems for Redox Flow Battery Electrolyte Hydration", and filed on Apr. 28, 2017. The entire contents of the above-listed application are hereby incorporated by reference for all purposes.

ACKNOWLEDGMENT OF GOVERNMENT SUPPORT

This invention was made with government support under contract no. DEAR0000261 awarded by the DOE, Office of ARPA-E. The government has certain rights in the invention.

FIELD

The present description relates generally to electrolyte preparation for a redox flow battery system.

BACKGROUND AND SUMMARY

Redox flow batteries are suitable for grid scale storage applications due to their capabilities of scaling power and capacity independently, and charging and discharging for thousands of cycles with minimal performance losses. Electrolyte, including aqueous solutions comprising water and salts and/or acids, are recirculated between electrolyte tanks and the redox flow battery cells in order to supply sufficient electrolyte to carry of the redox reactions for battery charging and discharging. Commissioning a new redox flow battery system traditionally involves hydrating and filling a redox flow battery system, including the electrolyte tanks, at a battery vendor's manufacturing facility, prior to transporting the redox flow battery system to and installing the redox flow battery system at the end-use location.

The inventors herein have recognized potential issues with the above methods. Namely, a filled and hydrated redox flow battery system is heavy and cumbersome, and transport of filled and hydrated redox flow battery systems can be difficult and expensive. Furthermore, transporting of redox flow battery systems between a battery vendor/manufacturing facility and an end-use site may involve various modes of transportation such as by truck, by rail, and by ship over large distances, which may be slower when the redox flow battery system is filled and hydrated. In addition, the overall system may be modified to accommodate transporting a large quantity of mixed and hydrated chemicals to be structurally sound across various modes of transportation.

In one example, the issues described above may be addressed by a method of operating a redox flow battery system, the redox flow battery system including first and second electrolyte chambers fluidly coupled to a redox flow battery cell, the method comprising: during a first condition, including when the redox flow battery system is in a dry state without water and liquid solvents, adding first and second amounts of dry electrolyte precursor to the first and second electrolyte chambers, respectively, the first and second amounts corresponding to a desired concentration of first and second electrolytes in the first and second electrolyte chambers during an operating mode, including when the redox flow battery system is being charged or discharged, fluidly coupling the redox flow battery system to a field hydration system, the field hydration system including a water supply pump fluidly coupled to a water source, and supplying water from the field hydration system to the redox flow battery system, wherein the redox flow battery system would remain in the dry state without the water from the field hydration system.

In this way, a redox flow battery system may be assembled and transported from a battery manufacturing facility to an end-use location off-site while the redox flow battery system is in a dry state, thereby reducing shipping costs, design complexities, environmental concerns, and the amount of time to prepare a customer-ready redox flow battery system. Furthermore the methods and system herein facilitate commissioning of the redox flow battery system, including hydration of the redox flow battery system in the dry state, that can be performed by a 3rd party or customer utilizing a field hydration system at the end-use location remotely from the battery manufacturing facility. In this manner, the customer can more flexibly and independently schedule the commissioning of the redox flow battery system, which can increase customer satisfaction and reduce operation logistics complexities. In some examples, the methods and systems herein further facilitate commissioning of the redox flow battery system, including on-site hydration by a customer, followed by draining of the redox flow battery system, and shipment to a second in-use location where it can be rehydrated for energy storage applications at the second in-use location.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
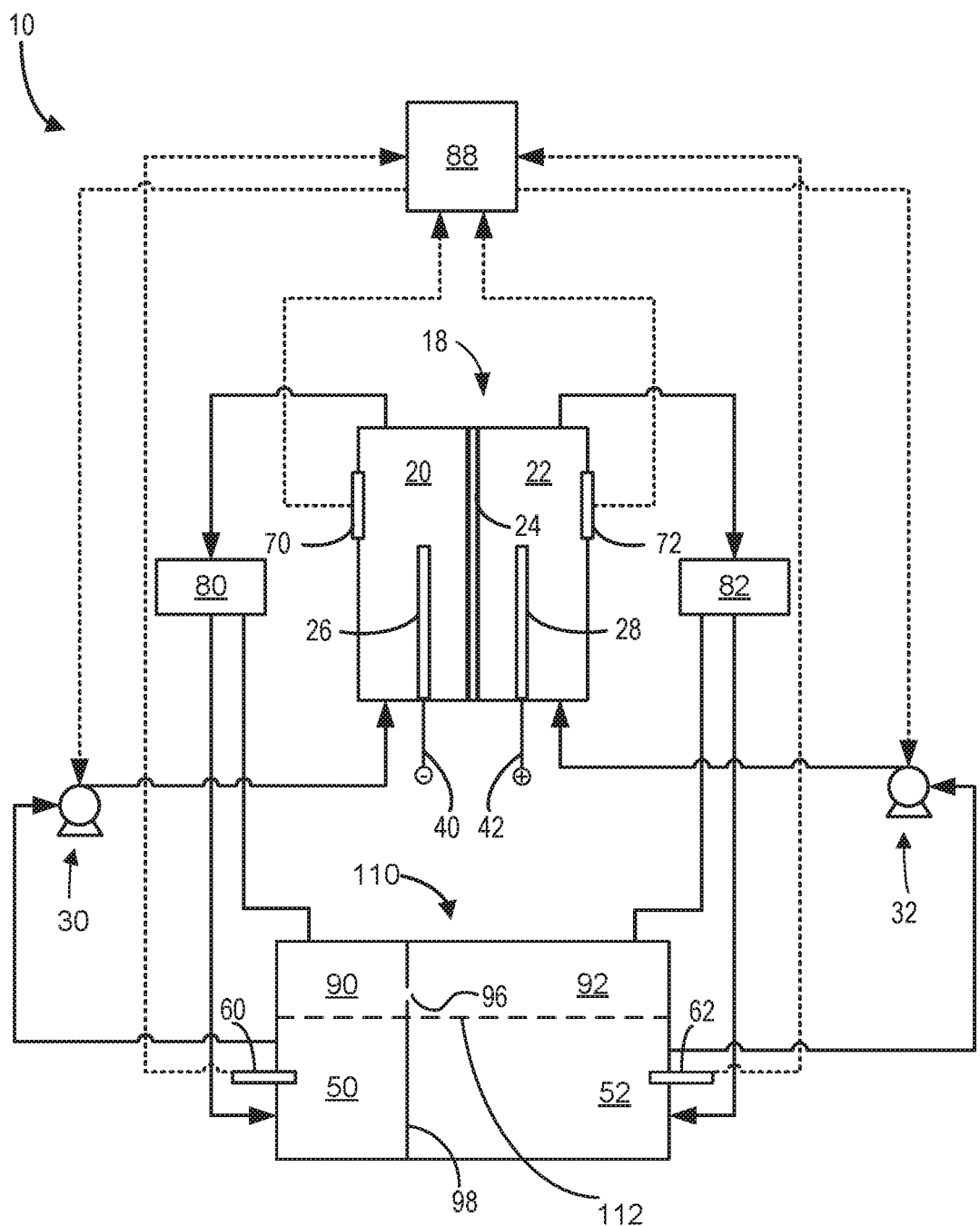
FIG. 1 shows a schematic of an example redox flow battery system.

The following description relates to systems and methods for flowing water to electrolytes configured to store electrical energy for a redox flow battery. The redox flow battery is shown in FIG. 1 includes an integrated multi-chamber storage tank having separate positive and negative electrolyte chambers. Prior to installation and commissioning of the redox flow battery system, the redox flow battery system may be assembled and delivered to a desired end-use location, different from a location where the battery was assembled, with dry electrolyte stored in the positive and negative electrolyte chambers. The dry electrolyte includes electrolyte granules or precursors free of liquid water and/or other liquid solvents in a moisture free state. Once delivered to the end-use location, the assembled redox flow battery system may be installed thereat, thereby fixing a position of the redox flow battery system. A field hydration system, shown in FIG. 2, may be delivered to the end-use location along with the assembled redox flow battery system, and coupled between a water source at the desired end-use location and the installed redox flow battery system. The field hydration system of FIG. 2 can facilitate staged hydration, filling, and preparation of the redox flow battery system, by way of methods illustrated in FIGS. 3 and 4A-4C.

Figure 2:
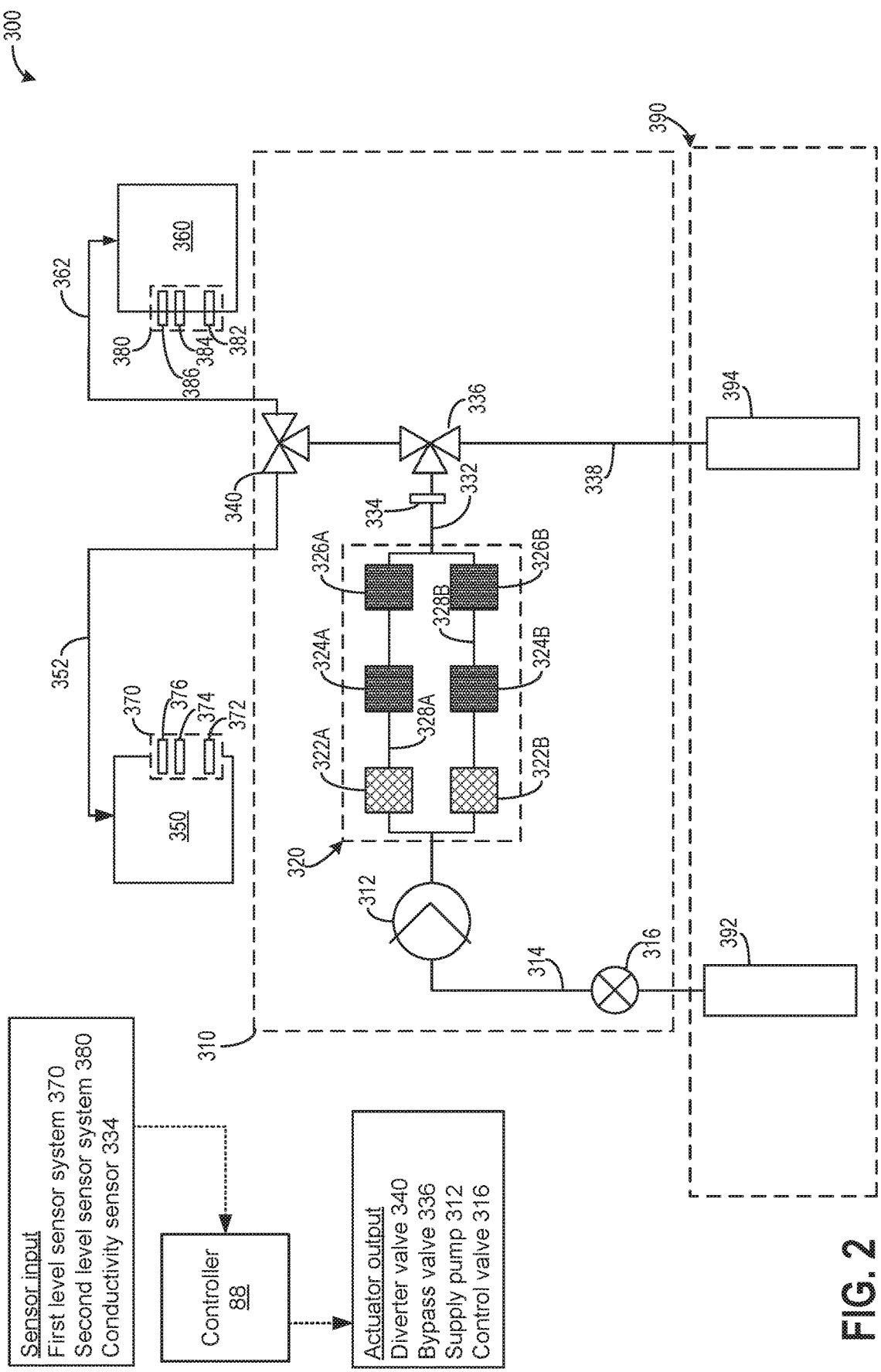
FIG. 2 shows a schematic of an example field hydration system.

FIGS. 1-2 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Hybrid redox flow batteries are redox flow batteries that are characterized by the deposit of one or more of the electro-active materials as a solid layer on an electrode. Hybrid redox flow batteries may, for instance, include a chemical that plates via an electrochemical reaction as a solid on a substrate throughout the battery charge process. During battery discharge, the plated species may ionize via an electrochemical reaction, becoming soluble in the electrolyte. In hybrid battery systems, the charge capacity (e.g., amount of energy stored) of the redox battery may be limited by the amount of metal plated during battery charge and may accordingly depend on the efficiency of the plating system as well as the available volume and surface area available for plating.

In a redox flow battery system the negative electrode 26 may be referred to as the plating electrode and the positive electrode 28 may be referred to as the redox electrode. The negative electrolyte within the plating side (e.g., negative electrode compartment 20) of the battery may be referred to as the plating electrolyte and the positive electrolyte on the redox side (e.g. positive electrode compartment 22) of the battery may be referred to as the redox electrolyte.

Anode refers to the electrode where electro-active material loses electrons and cathode refers to the electrode where electro-active material gains electrons. During battery charge, the positive electrolyte gains electrons at the negative electrode 26; therefore the negative electrode 26 is the cathode of the electrochemical reaction. During discharge, the positive electrolyte loses electrons; therefore the negative electrode 26 is the anode of the reaction. Accordingly, during charge, the negative electrolyte and negative electrode may be respectively referred to as the catholyte and cathode of the electrochemical reaction, while the positive electrolyte and the positive electrode may be respectively referred to as the anolyte and anode of the electrochemical reaction. Alternatively, during discharge, the negative electrolyte and negative electrode may be respectively referred to as the anolyte and anode of the electrochemical reaction, while the positive electrolyte and the positive electrode may be respectively referred to as the catholyte and cathode of the electrochemical reaction. For simplicity, the terms positive and negative are used herein to refer to the electrodes, electrolytes, and electrode compartments in redox battery flow systems.

One example of a hybrid redox flow battery is an all iron redox flow battery (IFB), in which the electrolyte comprises iron ions in the form of iron salts (e.g., $FeCl_2$, $FeCl_3$, and the like), wherein the negative electrode comprises metal iron. For example, at the negative electrode, ferrous ion, $Fe^{2+}$, receives two electrons and plates as iron metal on to the negative electrode 26 during battery charge, and iron metal, $Fe^0$, loses two electrons and re-dissolves as $Fe^{2+}$ during battery discharge. At the positive electrode, $Fe^{2-}$ loses an electron to form ferric ion, $Fe^{3+}$, during charge, and during discharge $Fe^{3-}$ gains an electron to form $Fe^{2+}$. The electrochemical reaction is summarized in equations (1) and (2), wherein the forward reactions (left to right) indicate electrochemical reactions during battery charge, while the reverse reactions (right to left) indicate electrochemical reactions during battery discharge:

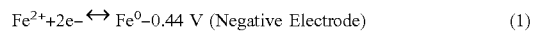

$Fe^{2+}+2e- \leftrightarrow Fe^0 -0.44$ V (Negative Electrode) (1)

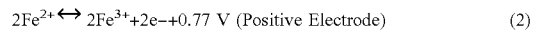

$2Fe^{2+} \leftrightarrow 2Fe^{3+}+2e- +0.77$ V (Positive Electrode) (2)

As discussed above, the negative electrolyte used in the all iron redox flow battery (IFB) may provide a sufficient amount of $Fe^{2+}$ so that, during charge, $Fe^{2+}$ can accept two electrons from the negative electrode to form $Fe^0$ and plate onto a substrate. During discharge, the plated $Fe^0$ may then lose two electrons, ionizing into $Fe^{2+}$ and be dissolved back into the electrolyte. The equilibrium potential of the above reaction is −0.44V and thus this reaction provides a negative terminal for the desired system. On the positive side of the IFB, the electrolyte may provide $Fe^{2+}$ during charge which loses electron and oxidizes to $Fe^{3+}$. During discharge, $Fe^{3+}$ provided by the electrolyte becomes $Fe^{2+}$ by absorbing an electron provided by the electrode. The equilibrium potential of this reaction is +0.77V, creating a positive terminal for the desired system.

The IFB provides the ability to charge and recharge its electrolytes in contrast to other battery types utilizing non-regenerating electrolytes. Charge is achieved by applying a current across the electrodes via terminals 40 and 42. The negative electrode may be coupled via terminal 40 to the negative side of a voltage source so that electrons may be delivered to the negative electrolyte via the positive electrode (e.g., as $Fe^{2+}$ is oxidized to $Fe^{3+}$ in the positive electrolyte in the positive electrode compartment 22). The electrons provided to the negative electrode 26 (e.g., plating electrode) can reduce the $Fe^{2+}$ in the negative electrolyte to form $Fe^0$ at the plating substrate causing it to plate onto the negative electrode.

Discharge can be sustained while $Fe^0$ remains available to the negative electrolyte for oxidation and while $Fe^{3+}$ remains available in the positive electrolyte for reduction. As an example, $Fe^{3+}$ availability can be maintained by increasing the concentration or the volume of the positive electrolyte to the positive electrode compartment 22 side of cell 18 to provide additional $Fe^{3+}$ ions via an external source, such as an external positive electrolyte tank 52. More commonly, availability of $Fe^0$ during discharge may be an issue in IFB systems, wherein the $Fe^0$ available for discharge may be proportional to the surface area and volume of the negative electrode substrate as well as the plating efficiency. Charge capacity may be dependent on the availability of $Fe^{2+}$ in the negative electrode compartment 20. As an example, $Fe^{2+}$ availability can be maintained by providing additional $Fe^{2+}$ ions via an external source, such as an external negative electrolyte tank 50 to increase the concentration or the volume of the negative electrolyte to the negative electrode compartment 20 side of cell 18.

In an IFB, the positive electrolyte comprises ferrous ion, ferric ion, ferric complexes, or any combination thereof, while the negative electrolyte comprises ferrous ion or ferrous complexes, depending on the state of charge of the IFB system. As previously mentioned, utilization of iron ions in both the negative electrolyte and the positive electrolyte allows for utilization of the same electrolytic species on both sides of the battery cell, which can reduce electrolyte cross-contamination and can increase the efficiency of the IFB system, resulting in less electrolyte replacement as compared to other redox flow battery systems.

Efficiency losses in an IFB may result from electrolyte crossover through the separator 24 (e.g., ion-exchange membrane barrier, micro-porous membrane, and the like). For example, ferric ions in the positive electrolyte may be driven toward the negative electrolyte by a ferric ion concentration gradient and an electrophoretic force across the separator. Subsequently, ferric ions penetrating the membrane barrier and crossing over to the negative electrode compartment 20 may result in coulombic efficiency losses. Ferric ions crossing over from the low pH redox side (e.g., more acidic positive electrode compartment 22) to high pH plating side (e.g., less acidic negative electrode compartment 20) can result in precipitation of $Fe(OH)_3$. Precipitation of $Fe(OH)_3$ can damage the separator 24 and cause permanent battery performance and efficiency losses. For example, $Fe(OH)_3$ precipitate may chemically foul the organic functional group of an ion-exchange membrane or physically clog the small micro-pores of an ion-exchange membrane. In either case, due to the $Fe(OH)_3$ precipitate, membrane ohmic resistance may rise over time and battery performance may degrade. Precipitate may be removed by washing the battery with acid, but the constant maintenance and downtime may be disadvantageous for commercial battery applications. Furthermore, washing may be dependent on regular preparation of electrolyte, an adding to process cost and complexity. Adding specific organic acids to the positive electrolyte and the negative electrolyte in response to electrolyte pH changes may also mitigate precipitate formation during battery charge and discharge cycling.

Additional coulombic efficiency losses may be caused by reduction of $H^+$ (e.g., protons) and subsequent formation of $H_2$ (e.g., hydrogen gas), and the reaction of protons in the negative electrode compartment 20 with electrons supplied at the plated iron metal electrode to form hydrogen gas.

The IFB electrolyte (e.g., $FeCl_2$, $FeCl_3$, $FeSO_4$, $Fe_2(SO_4)_3$, and the like) is readily available and can be produced at low costs. The IFB electrolyte offers higher reclamation value because the same electrolyte can be used for the negative electrolyte and the positive electrolyte, consequently reducing cross contamination issues as compared to other systems. Furthermore, owing to its electron configuration, iron may solidify into a generally uniform solid structure during plating thereof on the negative electrode substrate. For zinc and other metals commonly used in hybrid redox batteries, solid dendritic structures may form during plating. The stable electrode morphology of the IFB system may increase the efficiency of the battery in comparison to other redox flow batteries. Further still, iron redox flow batteries reduce the use of toxic raw materials and can operate at a relatively neutral pH as compared to other redox flow battery electrolytes. Accordingly, IFB systems reduce environmental hazards as compared with all other current advanced redox flow battery systems in production.

FIG. 1 provides a schematic illustration of a redox flow battery system 10. The redox flow battery system 10 may comprise a redox flow battery cell 18 fluidly connected to a multi-chambered electrolyte storage tank 110. The redox flow battery cell 18 may generally include a negative electrode compartment 20, separator 24, and positive electrode compartment 22. The separator 24 may comprise an electrically insulating ionic conducting barrier which prevents bulk mixing of the positive electrolyte and the negative electrolyte while allowing conductance of specific ions therethrough. For example, the separator 24 may comprise an ion-exchange membrane and/or a microporous membrane. The negative electrode compartment 20 may comprise a negative electrode 26, and a negative electrolyte comprising electroactive materials. The positive electrode compartment 22 may comprise a positive electrode 28, and a positive electrolyte comprising electroactive materials. In some examples, multiple redox flow battery cells 18 may be combined in series or parallel to generate a higher voltage or current in a redox flow battery system. Further illustrated in FIG. 1 are negative and positive electrolyte pumps 30 and 32, both used to pump electrolyte solution through the flow battery system 10. Electrolytes are stored in one or more tanks external to the cell, and are pumped via negative and positive electrolyte pumps 30 and 32 through the negative electrode compartment 20 side and the positive electrode compartment 22 side of the battery, respectively.

As illustrated in FIG. 1, the redox flow battery cell 18 may further include negative battery terminal 40, and positive battery terminal 42. When a charge current is applied to the battery terminals 40 and 42, the positive electrolyte is oxidized (lose one or more electrons) at the positive electrode 28, and the negative electrolyte is reduced (gain one or more electrons) at the negative electrode 26. During battery discharge, reverse redox reactions occur on the electrodes. In other words, the positive electrolyte is reduced (gain one or more electrons) at the positive electrode 28, and the negative electrolyte is oxidized (lose one or more electrons) at the negative electrode 26. The electrical potential difference across the battery is maintained by the electrochemical redox reactions in the positive electrode compartment 22 and the negative electrode compartment 20, and can induce a current through a conductor while the reactions are sustained. The amount of energy stored by a redox battery is limited by the amount of electro-active material available in electrolytes for discharge, depending on the total volume of electrolytes and the solubility of the electro-active materials.

The flow battery system 10 may further comprise an integrated multi-chambered electrolyte storage tank 110. The multi-chambered storage tank 110 may be divided by a bulkhead 98. The bulkhead 98 may create multiple chambers within the storage tank so that both the positive and negative electrolyte may be included within a single tank. The negative electrolyte chamber 50 holds negative electrolyte comprising electroactive materials, and the positive electrolyte chamber 52 holds positive electrolyte comprising electroactive materials. The bulkhead 98 may be positioned within the multi-chambered storage tank 110 to yield a desired volume ratio between the negative electrolyte chamber 50 and the positive electrolyte chamber 52. In one example, the bulkhead 98 may be positioned to set the volume ratio of the negative and positive electrolyte chambers according to the stoichiometric ratio between the negative and positive redox reactions. The figure further illustrates the fill height 112 of storage tank 110, which may indicate the liquid level in each tank compartment. The figure also shows gas head space 90 located above the fill height 112 of negative electrolyte chamber 50, and gas head space 92 located above the fill height 112 of positive electrolyte chamber 52. The gas head space 92 may be utilized to store hydrogen gas generated through operation of the redox flow battery (e.g., due to proton reduction and corrosion side reactions) and conveyed to the multi-chambered storage tank 110 with returning electrolyte from the redox flow battery cell 18. The hydrogen gas may be separated spontaneously at the gas-liquid interface (e.g., fill height 112) within the multi-chambered storage tank 110, thereby precluding having additional gas-liquid separators as part of the redox flow battery system. Once separated from the electrolyte, the hydrogen gas may fill the gas head spaces 90 and 92. A such, the stored hydrogen gas can aid in purging other gases from the multi-chamber storage tank 100, thereby acting as an inert gas blanket for reducing oxidation of electrolyte species, which can help to reduce redox flow battery capacity losses. In this way, utilizing the integrated multi-chambered storage tank 110 may forego having separate negative and positive electrolyte storage tanks, hydrogen storage tanks, and gas-liquid separators common to conventional redox flow battery systems, thereby simplifying the system design, reducing the physical footprint of the system, and reducing system costs.

FIG. 1 also shows the spill over-hole 96, which creates an opening in the bulkhead 98 between gas head spaces 90 and 92, and provides a means of equalizing gas pressure between the two chambers. The spill over hole 96 may be positioned a threshold height above the fill height 112. The spill over hole further enables a capability to self-balance the electrolytes in each of the positive and negative electrolyte chambers in the event of a battery crossover. In the case of an all iron redox flow battery system, the same electrolyte ($Fe^{2+}$) is used in both negative and positive electrode compartments 20 and 22, so spilling over of electrolyte between the negative and positive electrolyte chambers 50 and 52 may reduce overall system efficiency, but the overall electrolyte composition, battery module performance, and battery module capacity are maintained. Flange fittings may be utilized for all piping connections for inlets and outlets to and from the multi-chambered storage tank 110 to maintain a continuously pressurized state without leaks. The multi-chambered storage tank can include at least one outlet from each of the negative and positive electrolyte chambers, and at least one inlet to each of the negative and positive electrolyte chambers. Furthermore, one or more outlet connections may be provided from the gas head spaces 90 and 92 for directing hydrogen gas to rebalancing reactors 80 and 82.

Although not shown in FIG. 1, integrated multi-chambered electrolyte storage tank 110 may further include one or more heaters thermally coupled to each of the negative electrolyte chamber 50 and the positive electrolyte chamber 52. In alternate examples, only one of the negative and positive electrolyte chambers may include one or more heaters. In the case where only the positive electrolyte chamber includes one or more heaters, the negative electrolyte may be heated by transferring heat generated at the battery cells of the power module to the negative electrolyte. In this way, the battery cells of the power module may heat and facilitate temperature regulation of the negative electrolyte. The one or more heaters may be actuated by the controller 88 to regulate a temperature of the negative electrolyte chamber 50 and the positive electrolyte chamber independently or together. For example, in response to an electrolyte temperature decreasing below a threshold temperature, the controller may increase a power supplied to one or more heaters so that a heat flux to the electrolyte is increased. The electrolyte temperature may be indicated by one or more temperature sensors mounted at the multi-chambered electrolyte storage tank 110, including sensors 60 and 62. As examples the one or more heaters may include coil type heaters or other immersion heaters immersed in the electrolyte fluid, or surface mantle type heaters that transfer heat conductively through the walls of the negative and positive electrolyte chambers to heat the fluid therein. Other known types of tank heaters may be employed without departing from the scope of the present disclosure. Furthermore, controller 88 may deactivate one or more heaters in the negative and positive electrolyte chambers in response to a liquid level decreasing below a solids fill threshold level. Said in another way, controller 88 may activate the one or more heaters in the negative and positive electrolyte chambers only in response to a liquid level increasing above the solids fill threshold level. In this way, activating the one or more heaters without sufficient liquid in the positive and/or negative electrolyte chambers can be averted, thereby reducing a risk of overheating or burning out the heaters.

Further still, one or more inlet connections may be provided to each of the negative and positive electrolyte chambers from a field hydration system 310. In this way, the field hydration system can facilitate commissioning of the redox flow battery system, including installing, filling, and hydrating the system, at an end-use location. Furthermore, prior to its commissioning at the end-use location, the redox flow battery system may be dry-assembled at a battery manufacturing facility different from end-use location without filling and hydrating the system, before delivering the system to the end-use location. In one example, the end-use location may correspond to the location where the redox flow battery system is to be installed and utilized for on-site energy storage. Said in another way, it is anticipated that, once installed and hydrated at the end-use location, a position of the redox flow battery system becomes fixed, and the redox flow battery system is no longer deemed a portable, dry system. Thus, from the perspective of a redox flow battery system end-user, the dry portable redox flow battery system may be delivered on-site, after which the redox flow battery system is installed, hydrated and commissioned. Prior to hydration the redox flow battery system may be referred to as a dry, portable system, the redox flow battery system being free of or without water and wet electrolyte. Once hydrated, the redox flow battery system may be referred to as a wet non-portable system, the redox flow battery system including wet electrolyte.

Further illustrated in FIG. 1, electrolyte solutions typically stored in the multi-chambered storage tank 110 are pumped via negative and positive electrolyte pumps 30 and 32 throughout the flow battery system 10. Electrolyte stored in negative electrolyte chamber 50 is pumped via negative electrolyte pump 30 through the negative electrode compartment 20 side, and electrolyte stored in positive electrolyte chamber 52 is pumped via positive electrolyte pump 32 through the positive electrode compartment 22 side of the battery.

Two electrolyte rebalancing reactors 80 and 82, may be connected in-line or in parallel with the recirculating flow paths of the electrolyte at the negative and positive sides of the battery, respectively, in the redox flow battery system 10. One or more rebalancing reactors may be connected in-line with the recirculating flow paths of the electrolyte at the negative and positive sides of the battery, and other rebalancing reactors may be connected in parallel, for redundancy (e.g., a rebalancing reactor may be serviced without disrupting battery and rebalancing operations) and for increased rebalancing capacity. In one example, the electrolyte rebalancing reactors 80 and 82 may be placed in the return flow path from the positive and negative electrode compartments 20 and 22 to the positive and negative electrolyte chambers 50 and 52, respectively. Electrolyte rebalancing reactors 80 and 82 may serve to rebalance electrolyte charge imbalances in the redox flow battery system occurring due to side reactions, ion crossover, and the like, as described herein. In one example, electrolyte rebalancing reactors 80 and 82 may include trickle bed reactors, where the hydrogen gas and electrolyte are contacted at catalyst surfaces in a packed bed for carrying out the electrolyte rebalancing reaction. In other examples the rebalancing reactors 80 and 82 may include flow-through type reactors that are capable of contacting the hydrogen gas and the electrolyte liquid and carrying out the rebalancing reactions in the absence a packed catalyst bed.

During operation of a redox flow battery system, sensors and probes may monitor and control chemical properties of the electrolyte such as electrolyte pH, concentration, state of charge, and the like. For example, as illustrated in FIG. 1, sensors 62 and 60 maybe be positioned to monitor positive electrolyte and negative electrolyte conditions at the positive electrolyte chamber 52 and the negative electrolyte chamber 50, respectively. In another example, sensors 62 and 60 may each include one or more electrolyte level sensors to indicate a level of electrolyte in the positive electrolyte chamber 52 and the negative electrolyte chamber 50, respectively, as described further with reference to FIG. 2. As another example, sensors 72 and 70, also illustrated in FIG. 1, may monitor positive electrolyte and negative electrolyte conditions at the positive electrode compartment 22 and the negative electrode compartment 20, respectively. Sensors may be positioned at other locations throughout the redox flow battery system to monitor electrolyte chemical properties and other properties. For example a sensor may be positioned in an external acid tank (not shown) to monitor acid volume or pH of the external acid tank, wherein acid from the external acid tank is supplied via an external pump (not shown) to the redox flow battery system in order to reduce precipitate formation in the electrolytes. Additional external tanks and sensors may be installed for supplying other additives to the redox flow battery system 10. For example, various sensors including, temperature, conductivity, and level sensors of a field hydration system 310 may transmit signals to the controller 88. Furthermore, controller 88 may send signals to actuators such as valves and pumps of the field hydration system 310 during hydration of the redox flow battery system. Sensor information may be transmitted to a controller 88 which may in turn actuate pumps 30 and 32 to control electrolyte flow through the cell 18, or to perform other control functions, as an example. In this manner, the controller 88 may be responsive to, one or a combination of sensors and probes.

Redox flow battery system 10 may further comprise a source of hydrogen gas. In one example the source of hydrogen gas may comprise a separate dedicated hydrogen gas storage tank. In the example of FIG. 1, hydrogen gas may be stored in and supplied from the integrated multi-chambered electrolyte storage tank 110. Integrated multi-chambered electrolyte storage tank 110 may supply additional hydrogen gas to the positive electrolyte chamber 52 and the negative electrolyte chamber 50. Integrated multi-chambered electrolyte storage tank 110 may alternately supply additional hydrogen gas to the inlet of electrolyte rebalancing reactors 80 and 82. As an example, a mass flow meter or other flow controlling device (which may be controlled by controller 88) may regulate the flow of the hydrogen gas from integrated multi-chambered electrolyte storage tank 110. The integrated multi-chambered electrolyte storage tank 110 may supplement the hydrogen gas generated in redox flow battery system 10. For example, when gas leaks are detected in redox flow battery system 10 or when the reduction reaction rate is too low at low hydrogen partial pressure, hydrogen gas may be supplied from the integrated multi-chambered electrolyte storage tank 110 in order to rebalance the state of charge of the electro-active species in the positive electrolyte and negative electrolyte. As an example, controller 88 may supply hydrogen gas from integrated multi-chambered electrolyte storage tank 110 in response to a measured change in pH or in response to a measured change in state of charge of an electrolyte or an electro-active species. For example an increase in pH of the negative electrolyte chamber 50, or the negative electrode compartment 20, may indicate that hydrogen is leaking from the redox flow battery system 10 and/or that the reaction rate is too slow with the available hydrogen partial pressure, and controller 88, in response to the pH increase, may increase a supply of hydrogen gas from integrated multi-chambered electrolyte storage tank 110 to the redox flow battery system 10. As a further example, controller 88 may supply hydrogen gas from integrated multi-chambered electrolyte storage tank 110 in response to a pH change, wherein the pH increases beyond a first threshold pH or decreases beyond second threshold pH. In the case of an IFB, controller 88 may supply additional hydrogen to increase the rate of reduction of ferric ions and the rate of production of protons, thereby reducing the pH of the positive electrolyte. Furthermore, the negative electrolyte pH may be lowered by hydrogen reduction of ferric ions crossing over from the positive electrolyte to the negative electrolyte or by proton generated at the positive side crossing over to the negative electrolyte due to a proton concentration gradient and electrophoretic forces. In this manner, the pH of the negative electrolyte may be maintained within a stable region, while reducing the risk of precipitation of ferric ions (crossing over from the positive electrode compartment) as $Fe(OH)_3$. Other control schemes for controlling the supply rate of hydrogen gas from integrated multi-chambered electrolyte storage tank 110 responsive to a change in an electrolyte pH or to a change in an electrolyte state of charge, detected by other sensors such as an oxygen-reduction potential (ORP) meter or an optical sensor, may be implemented. Further still, the change in pH or state of charge triggering the action of controller 88 may be based on a rate of change or a change measured over a time period. The time period for the rate of change may be predetermined or adjusted based on the time constants for the redox flow battery system. For example the time period may be reduced if the recirculation rate is high, and local changes in concentration (e.g., due to side reactions or gas leaks) may quickly be measured since the time constants may be small.

Turning now to FIG. 2, it shows an embodiment 300 of a field hydration system 310 configured to couple to an external water supply 390. Solid lines in FIG. 2 indicate passages in the field hydration system, such as the supply line 314, for conveying water. Intervening components located atop the solid lines illustrate one or more components arranged along the respective passages. The components may filter the water, transmit signals to one or more controllers (including controller 88) indicating a condition of the water (e.g., a conductivity, flow rate, and the like), and the controller may send signals to the components for regulating flow to various passages located within the field hydration system 310. The external water supply 390 is located outside of the field hydration system 310 and is configured to deliver water to and receive water from field hydration system 310 during hydration of a redox flow battery system fluidly coupled to the field hydration system 310 at an end-use location. The hydration of a redox flow battery system by way of field hydration system 310 is described in greater detail below with respect to FIGS. 4A, 4B, and 4C. As described above, a controller, such as controller 88 may send and receive signals to one or more sensors, valves, pumps, and the like, of the field hydration system 310. In one example, field hydration system 310 may include its own dedicated controller is similar to the controller 88 of FIG. 1. In this case, the dedicated controller and the controller 88 may send and receive signals therebetween in order to coordinate hydration of the redox flow battery system. Furthermore, the dedicated controller and/or controller 88 may comprise executable instructions stored on memory thereon that enable the controllers to adjust various sensors and actuators described below in the field hydration system 310 and the redox flow battery system 10 in order to hydrate the redox flow battery system. Additionally or alternatively, one or more of the actions described herein may be performed manually by an operator.

The field hydration system 310 may be a portable system, and may be delivered disassembled as its component parts to an end-use location of the redox flow battery system where the field hydration system can be assembled. In other examples, the field hydration system 310 may be deployed in an assembled or partially assembled form to the end-use location where redox flow battery installation is desired. For example, the end-use location may include a customer's facility where energy storage provided by the redox flow battery system is to be utilized. As such, following delivery and installation of the redox flow battery system 10 at the end-use location, including fixedly coupling the redox flow battery system to a surface (thereby fixing a position thereat), the field hydration system 310 may be assembled and fluidly coupled to the redox flow battery system 10. As described above with reference to FIG. 1, the field hydration system 310 may be fluidly coupled to the redox flow battery system 10 by way of one or more inlets and outlets to and from the negative and positive electrolyte chambers 50 and 52. In the example of FIG. 1, the negative and positive electrolyte chambers 50 and 52 are included within an integrated multi-chamber storage tank 110. In other example redox flow battery systems, the negative and positive electrolyte chambers 50 and 52 may respectively be included in separate electrolyte storage tanks. The field hydration system 310 comprises one or more components configured to prepare (e.g., hydrate) electrolytes for both positive and negative terminals of a redox flow battery, as will be described in greater detail below. In the example of FIG. 2, field hydration system includes a water supply pump 312 for supplying water from a supply source 392, filtration system 320, and bypass and diverter valves 336 and 340 for directing water to drain and to the electrolyte chambers, respectively.

The electrolyte preparation may include determining a desired electrolyte chemical composition, which may include determining a startup concentration of the electrolytes at each of the positive and negative electrolyte chambers. The electrolytes may include one or more of salts and acids, as described previously. The startup concentration may be based on one or more of composition of the electrolytes, the composition of the electrolyte chambers, the specific battery chemistry, and power output of the redox flow battery.

The field hydration system 310 comprises a water supply pump 312 fluidly coupled to receive water from a water supply 392 of the external system 390. In one example the water supply 392 may comprise a municipal water supply or a treated water supply such as a deionized water or distilled water supply. The water supply pump 312 is fluidly coupled to the water supply 392 via a supply line 314. The supply line 314 may be a rigid pipe, flexible hose, and/or conduit configured to direct water from the water supply 392 to the water supply pump 312. The supply line 314 may be flexible, and or rigid, or both. In some embodiments, additionally or alternatively, the supply line 314 may comprise one or more bends to accommodate a flow path for coupling the field hydration system 310 to the water supply 392. A water intake control valve 316 may be positioned in the supply line 316 between the water supply 392 and the water supply pump 312 for adjusting water flow to the water supply pump 312. In one example, the water intake control valve 316 is an electronic valve electrically coupled to one or more controllers (such as controller 88) and configured to actuate through a range of positions between fully closed and fully open. For example, the water intake control valve 316 may move to a more closed position, where less water is admitted into the supply line 314 than in a more open position. It will be appreciated that the water intake control valve 316 may be mechanical and/or pneumatic without departing from the scope of the present disclosure.

The water supply pump 312 may be electrically, hydraulically, electrically, and/or fuel powered. The water supply pump 312 is configured to direct water throughout one or more passages located downstream of the water supply pump 312 relative to a direction of water flow. The water supply pump 312 draws water from the water supply 392, where the water flows through the supply line 314 and is directed by the water supply pump 312 to a filtration system 320. The filtration system 320 is downstream of the water supply pump 312 relative to a direction of water flow. The filtration system 320 may include one or more arrays or banks of filters arranged in parallel. Having a plurality of banks arranged in parallel may allow for a higher capacity of water filtration, and may enable continued filtration of water when a filter capacity has been reached and while one or more filters are replaced. Each of the banks may comprise one or more filters configured to remove contaminants from the supply water. In the example hydration system of FIG. 2, a first bank of filters comprises a first filter 322, a second filter 324, and a third filter 326, corresponding to a three-stage filtration. Likewise, a second bank of filters comprises a first filter 322, a second filter 324, and a third filter 326, corresponding to a three-stage filtration. The first filters 322A and 322B may be substantially identical to one another in size, shape, and composition. The first filters 322A and 322B may be deionizing or charcoal filters.

The second filters 324A and 324B and the third filters 326A and 326B may be substantially identical in size, shape, and composition. The second filters 324A and 324B and third filters 326A and 326B may be deionizing or charcoal filters. In one example, the first filters 322A and 322B are deionizing filters and the second filters 324A, 324B, and third filters 326A, 326B are charcoal filters. Additionally or alternatively, one or more of the filters may be a combination filter having both deionizing and charcoal elements. The filters may be configured to remove one or more of salts, particulates, and other impurities, such that the water exiting the filtration system 320 may have a conductivity less than a threshold conductivity. As such, water flowing downstream of the filtration system 320 may consist essentially of $H_2O$, in one example.

The supply line 314 delivers water into the filtration system 320, where the supply line 314 bifurcates into a first filter passage 328A and a second filter passage 328B. First filter 322A, second filter 324A, and third filter 326A (e.g., the first filter set) are arranged along the first filter passage 328A. First filter 322B, second filter 324B, and third filter 326B (e.g., the second filter set) are arranged along the second filter passage 328B. In one example, the first 328A and second 328B filter passages are separated to increase a water flow rate through the filtration system 320. Filtered water from the first filter passage 328 and the second filter passage 328 combine in a single feed line 332 before flowing to a sensor.

One or more sensors 334 are arranged in the feed line 332 directly downstream of the filtration system 320. In one example, the sensor 334 includes a conductivity sensor 334. The conductivity sensor 334 is configured to measure a conductivity of the filtered water flowing through the feed line 332 toward a bypass valve 336 and a diverter valve 340 fluidly coupled downstream from the bypass valve. In the example of FIG. 2, bypass valve 336 and diverter valves 340 are 3-way valves. This may be accomplished by monitoring a salt concentration in the water downstream of the filtration system 320. In one example, operation of a diverter valve 340 and/or a bypass valve 336 may be adjusted based on feedback from the conductivity sensor. For example, if the conductivity sensor measures a filtered water sample having a conductivity greater than a threshold conductivity, then the controller (e.g., controller 88 of FIG. 1) may signal to an actuator of bypass valve 336 to direct flow away from diverter valve 340 to the drain 394. The threshold conductivity may refer to a conductivity above which degradation of the redox flow battery system may occur or a coulombic efficiency of the flow battery system may be less than desired. For example, hydrating the redox flow battery system with water having a conductivity greater than the threshold conductivity may interfere with ion transport across the separator, lower mass transfer and diffusion of metal ions to and from the battery cell electrodes, degrade pH control, induce premature charge capacity loss, and the like. In this way, water having a higher conductivity may be delivered from the feed line 332 to the drain 394 of the external system 390 is fluidly coupled to the bypass line 338, thereby reducing a risk of degradation of the redox flow battery system.

In contrast, if the conductivity measured at sensor 334 is less than the threshold conductivity, then the controller may position bypass valve 336 to direct water flow towards diverter valve 340. Depending on a position of diverter valve 340, filtered water may then be directed to flow towards the first electrolyte chamber 350 or the second electrolyte chamber 360 of a redox flow battery system. In one example, the first electrolyte chamber 350 and the second electrolyte chamber 360 may correspond to the negative electrolyte chamber 50 and the positive electrolyte chamber 52, respectively, of an integrated multi-chamber storage tank 110. In this way field hydration system 310 may be fluidly coupled to the redox flow battery system 10. In other examples, the first electrolyte chamber 350 or the second electrolyte chamber 360 may correspond to negative and positive electrolyte chambers, each positioned in separate electrolyte storage tanks. Furthermore, the first electrolyte chamber may alternately represent a positive electrolyte chamber and the second electrolyte chamber may represent a negative electrolyte chamber. By fluidly coupling the field hydration system to the redox flow battery system 10, the negative and positive electrolyte solutions may be prepared in-situ and at the end-use location away from the battery manufacturing facility from a dry redox flow battery system including dry electrolyte and free of water and wet electrolyte. The flow rate of filtered water to first and second electrolyte chambers 350 and 360 may be regulated by water supply pump 312.

As described above with reference to electrolyte chambers 50 and 52, the first electrolyte chamber and the second electrolyte chambers 350 and 360 may each include one or more level sensors electrically coupled to the controller 88. For example, first electrolyte chamber 350 may comprise a first level sensor system 370 including a first level sensor 372, a second level sensor 374, and a third level sensor 376. The first 372, second 374, and third 376 level sensors maybe be vertically stacked above one another, with the third sensor 376 being positioned higher than the second level sensor 374 and the second sensor being positioned than the first level sensor 372. In this way, the sensors may detect three distinct fluid levels in the first electrolyte chamber 350, which can aid in facilitating a staged filling process thereof. In another configuration, first level sensor system 370 may include a pressure-type level sensor capable of measuring the fluid level in the first electrolyte chamber 350 based on a hydraulic pressure therein. A second level sensor system 380 for the second electrolyte chamber 360 may include first, second, and third level sensors 382, 384, and 386, respectively. The second level sensor system 380 may be configured similarly to the first level sensor system 370, as previously described.

The second level sensor system 380 is substantially identical to the first level sensor system 370 in function, wherein both systems utilize the sensors located therein for monitoring a fill-level of the tanks. As an example, the first level sensor system 370 may monitor a stage-wise filling the first electrolyte chamber 350 to lower, intermediate, and upper threshold volumes via the first 372, second 374, and third 376 sensors, respectively. Likewise, the second level sensor system 380 may monitor a stage-wise filling the second electrolyte chamber 360 to lower, intermediate, and upper threshold volumes via the first 382, second 384, and third 386 sensors, respectively. A location of sensors in the first electrolyte chamber 350 and the second electrolyte chamber 360 may thus be positioned to correspond to the lower, intermediate, and upper threshold volumes of both first and second electrolyte chambers 350 and 360, respectively. The lower, intermediate, and upper threshold volumes of both first and second electrolyte chambers 350 and 360 may be the same or disparate.

In some examples, additionally or alternatively, the field hydration system 310 may be configured to drain one or more of the first 350 and second 360 electrolyte chambers. As such, a water level of one or more of the first 350 and second 360 electrolyte chambers may decrease. Once a sufficient amount of water is removed from the tanks, the tanks may be suitable for transportation to location different than the current location. In some examples the liquid electrolyte may be completely drained from the redox flow battery system, and a first and second amount of dry electrolyte precursor may be added to the first and second electrolyte chambers. In one example, draining of liquid electrolyte from the first and second electrolyte chambers may be conducted by directing electrolyte therefrom through diverter valve 340 and bypass valve 336 to the drain 394. As previously described, the first and second amounts may correspond to a desired concentration of first and second electrolytes in the first and second electrolyte chambers during an operating mode. In this way, electrolytes are shipped dry in the redox flow battery system from a first in-use location to a second in-use location, where the electrolytes are hydrated in response to a demand to use the redox flow battery system. However, in response to a demand to move the redox flow battery system from the second location to a third in-use location, the electrolytes may be drained of water and/or liquid electrolyte and transported to the third location. In response to a demand to use the redox flow battery system, the electrolytes are hydrated similarly to the hydration at the second location.

Figure 3:
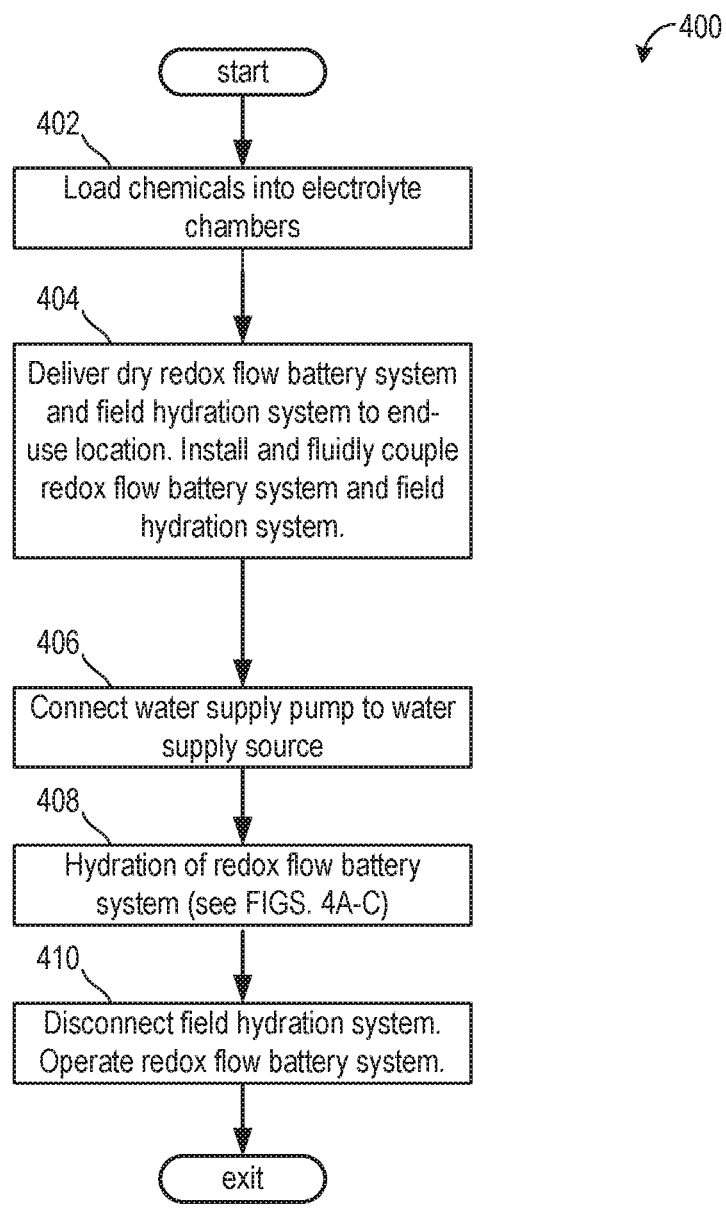
FIG. 3 shows a high-level flow chart for a method of hydrating a redox flow battery system with the field hydration system of FIG. 2.

Turning now to FIG. 3, it shows a high-level flow chart depicting a method 400 for hydrating a redox flow battery system with the field hydration system 310. Instructions for carrying out method 400 and the rest of the methods included herein may be executed by a controller (e.g., controller 88) based on instructions stored on a memory of the controller and in conjunction with signals received from sensors of the redox flow battery system 10 and the field hydration system 310 such as the sensors described above with reference to FIGS. 1 and 2. The controller may employ actuators of the redox flow battery system and/or field hydration system of FIG. 2 to adjust operation thereof, according to the methods described below.

The method 400 begins at 402, where the method includes loading chemicals (e.g., dry electrolyte precursors) into the first 350 and second 360 electrolyte chambers of FIG. 2. As described above, in some cases, the dry electrolyte precursors may be pre-loaded prior to delivery to the end-use site. In other cases, the dry electrolyte precursors may be shipped in appropriate storage vessels such as drums or sacks, and loaded into the first and second electrolyte chambers at the end-use location. In some cases, the electrolyte precursors may be in completely anhydrous form. In some cases, the precursors may be in crystal form. In some cases, the precursors may be in concentrated forms. In any case, the pre-hydrated redox flow battery system, including the first and second electrolyte chambers 350 and 360, consists essentially of a dry system, free of water and wet electrolyte. In the case of an IFB, the dry chemicals may include one or more of $FeCl_2$, $FeCl_3$, $FeSO_4$, $Fe_2(SO_4)_3$, and the like. An amount of dry chemicals loaded into each of the chambers may be based on a desired electrolyte composition for each of the first and second electrolyte chambers. The chemicals are loaded into the tanks and/or chambers dry and free of water and/or other liquid solvents. This ensures the chemicals are stored in the tanks and/or chambers in a dry state.

At 404, the method includes transporting the redox flow battery system, including the first and second electrolyte chambers 350 and 360, and the field hydration system 310 to the end-use site. Transporting may include shipping by truck, rail, ship, or other mode of transportation. As described above, in the dry state, the redox flow battery system, and the field hydration system may be considered as portable systems. Furthermore, the field hydration system 310 may be disassembled into its component parts to facilitate transport. Also at 404, the redox flow battery system may be installed at the end-use location, fixing a position thereof. Furthermore, the field hydration system may be assembled, installed, and fluidly coupled to the redox flow battery system. At 406, the method includes connecting a water supply pump 312 of the field hydration system 310 to a water supply source 392 at the end-use location. In the example of FIG. 2, the water supply pump 312 is coupled to a water source 392 via the supply line 314. At 408, the method includes hydration of the redox flow battery system. This may include activating the water supply pump 312 and flowing water through the various hoses, pipes, filters, sensors, and valves of the field hydration system. Hydration of the redox flow battery system is described in greater detail with respect to FIGS. 4A, 4B and 4C. At 410, following hydration of the redox flow battery system, the redox flow battery system may begin operation as described with reference to FIG. 1. The redox flow battery system may begin operation, including charging of the redox flow battery system, in response to decoupling the field hydration system 310 therefrom. After beginning operation of the redox flow battery system, the field hydration system 310 may be disassembled, portably relocated, assembled and recoupled to the same or another redox flow battery system for commissioning and hydrating the redox flow battery system with the field hydration system and/or draining the redox flow battery system. In this way the field hydration system together with a redox flow battery system may convert the redox flow battery system to a self-draining rehydratable redox flow battery system.

Figure 4A:
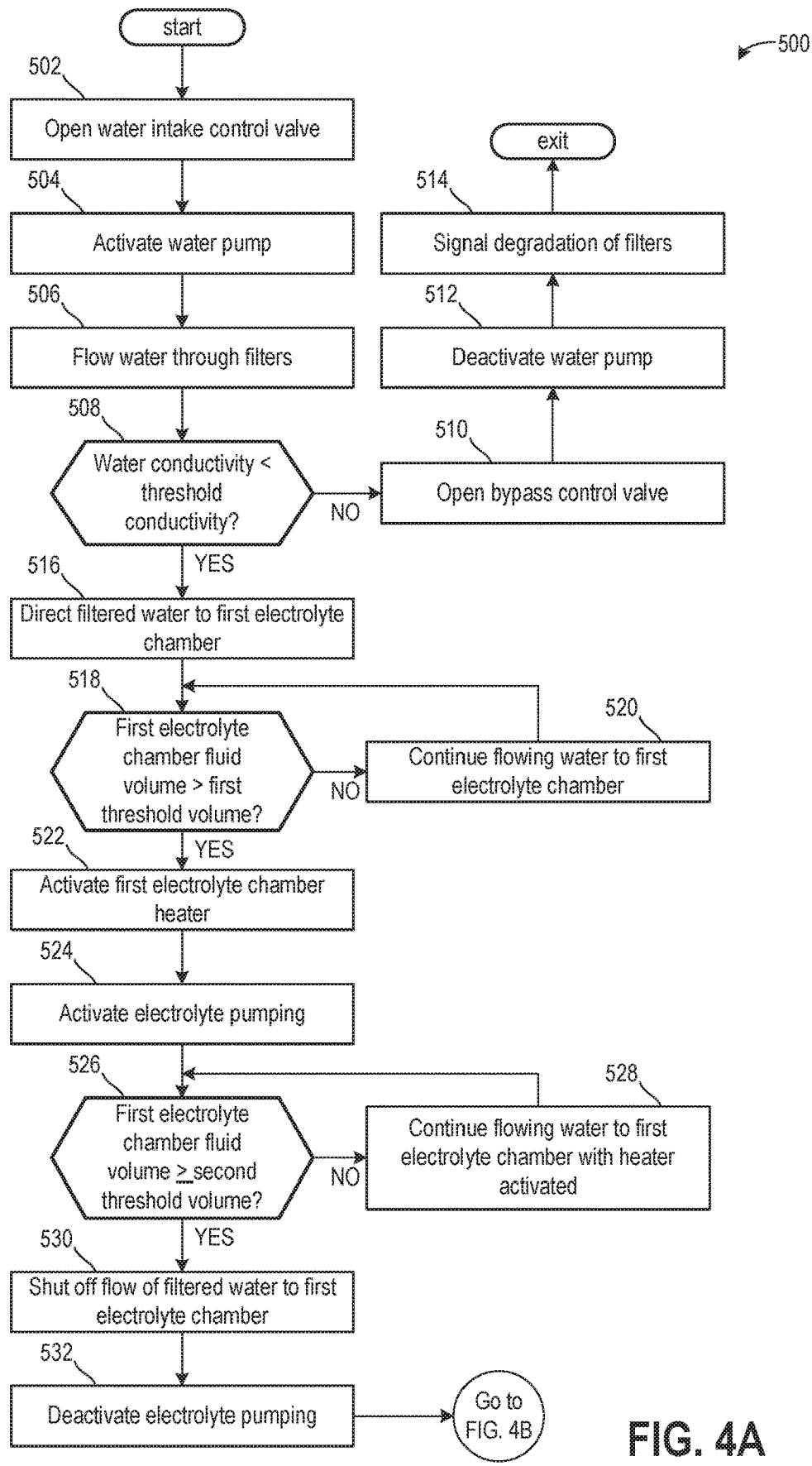
FIGS. 4A, 4B, and 4C show flow charts for a method for hydrating a redox flow battery system with the field hydration system of FIG. 2.
Figure 4B:
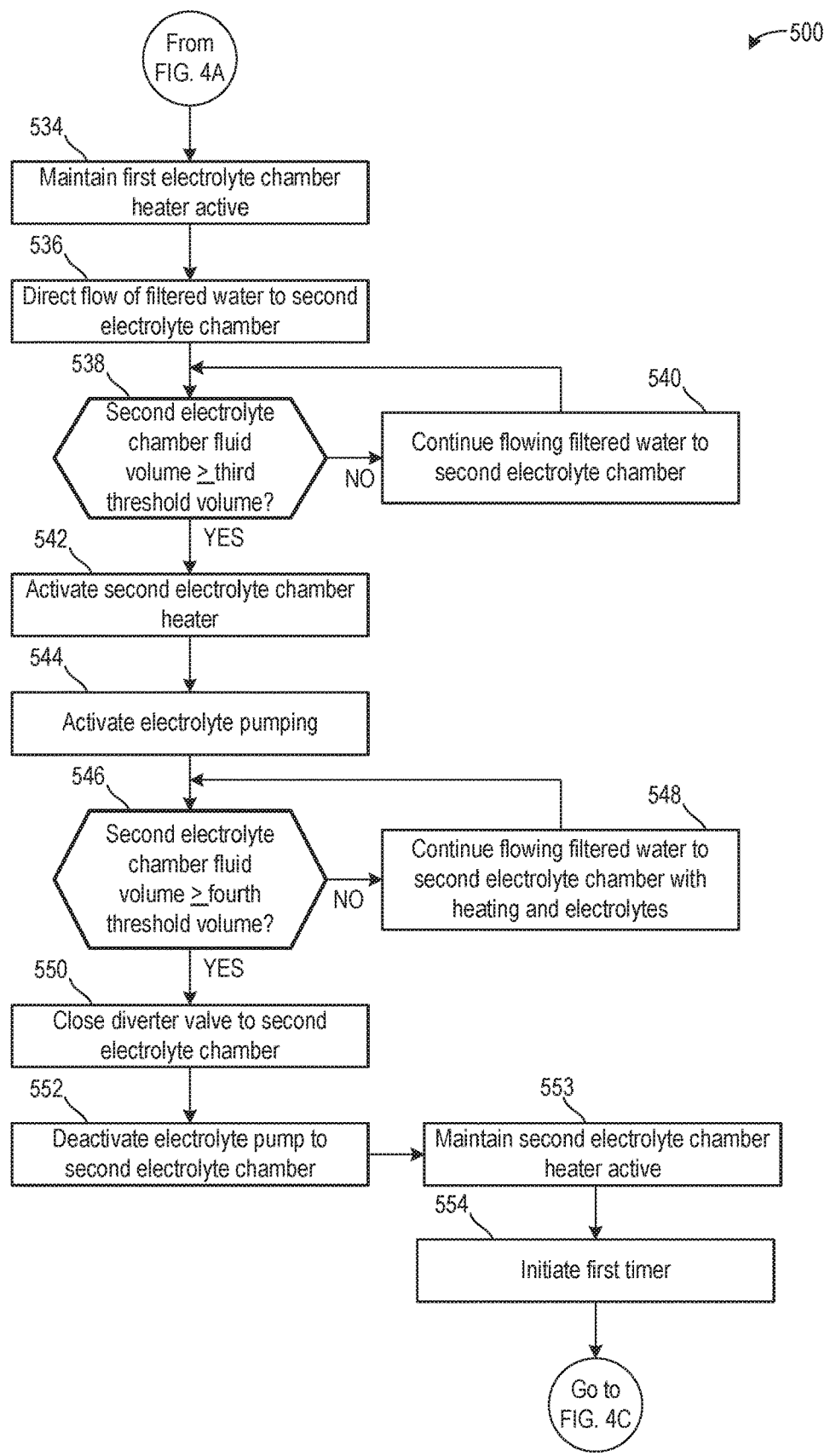
Figure 4C:
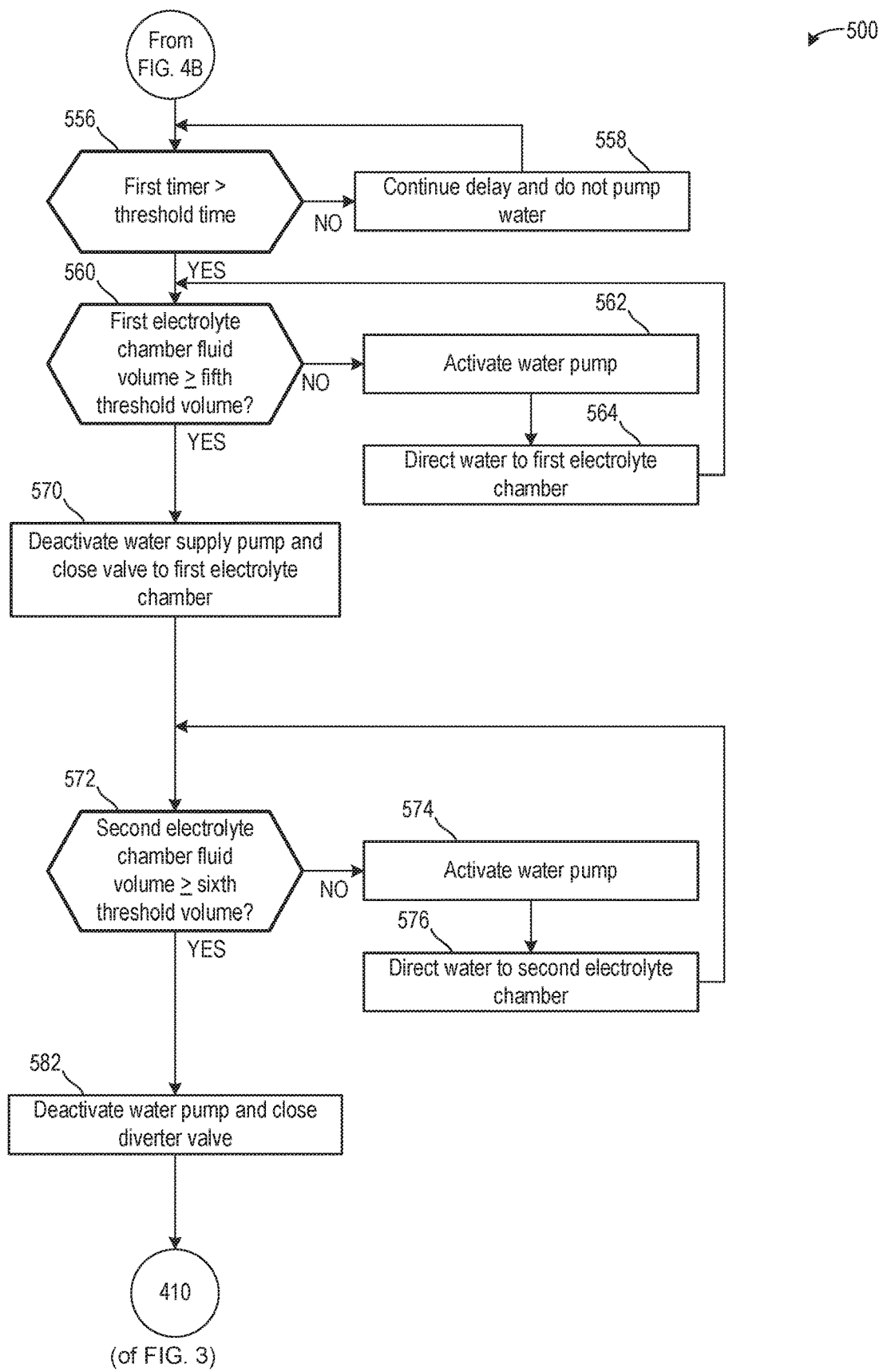

Turning now to FIGS. 4A, 4B, and 4C, they show a method 500 for hydrating the dry electrolytes in the first and second electrolyte chambers 350 and 360. Specifically, the method 500 further describes hydration of a dry redox flow battery system (step 408 of method 400 of FIG. 3).

The method 500 begins at 502, where the method includes opening the water intake control valve 316. In one example, the water intake control valve is moved to a fully open position to allow water from the water supply to flow to the water supply pump 312 via the supply line. At 504, the method may include activating the water supply pump 312, which conveys water flow through the field hydration system 310 to the first and second electrolyte chambers 350 and 360. At 506, the method may include flowing water through one or more filters of a filtration system 320 to remove impurities, and to lower the supply water conductivity.

At 508, the method includes determining if a water conductivity is less than a threshold conductivity. The conductivity may be measured by one or more conductivity sensors. If the water conductivity is not less than the threshold, one or more filters of the filtration system 320 may be exhausted. Thus method 500 may proceed from 508 to 510, where the bypass control valve 336 may be positioned to direct water flow to the drain 394, thereby bypassing the redox flow battery system. The water conductivity may be continuously monitored by the controller via conductivity sensor 334 throughout the method 500. Thus, at any point during hydration of the redox flow battery system may be stopped or paused by positioning bypass control valve 336 to direct the supply water flow to the drain during a condition where the conductivity of the supply water is greater than the threshold conductivity.

For the case where the supply water conductivity is greater than the threshold conductivity, method 500 may proceed to 512 from 510, where the method includes deactivating the water supply pump 312, thereby stopping the supply of water from the water source external to the field hydration system. For example, water intake control valve 316 may be adjusted to the fully closed position, thereby preventing water from flowing from the water source 392 to the supply line 314 of FIG. 2. Next, at 514, in response to the supply water conductivity being greater than the threshold conductivity, the method may include signaling degradation of one or more filters of the field hydration system. Signaling degradation may include sending an audio and/or visual signal to the operator. In the example of FIG. 2, each of the filters is indicated degraded due to the conductivity sensor being location downstream of a junction where filtered water from the two banks of filters merge in the feed line. However, it will be appreciated that each bank may comprise its own conductivity sensor, such that one bank may be flagged as degraded and the other bank may not. Additionally or alternatively, a conductivity sensor may be located directly downstream of each individual filter. In this way, each filter of the filter system may be individually diagnosed after water flows therethrough.

Returning to 508, if the water conductivity is less than the threshold conductivity, then hydration of the dry electrolyte precursors in the first electrolyte chamber may be initiated, including stage-wise filling and heating thereof. The method may proceed to 516 from 508, where the method includes positioning the bypass valve 336 and the diverter valve 340 to direct the flow of filtered water to the first electrolyte chamber 350. As such, water from the filtration system 320 flows through the feed line 332, through the first electrolyte chamber passage 352, and into the first electrolyte chamber 350. In this way, hydration of the dry electrolyte precursors in the first electrolyte chamber 350 is initiated. However, chemicals in the second electrolyte chamber and/or second chamber are free of water and remain dry. It will be appreciated that in alternative embodiments, water may flow to the second electrolyte chamber before flowing to the first electrolyte chamber without departing from the scope of the present disclosure.

At 518, the method may include determining if a first electrolyte chamber volume is greater than a first threshold volume (e.g., a first electrolyte chamber lower threshold volume). Determining if the first electrolyte chamber volume is greater than the first threshold volume may include determining if a fluid level in the first electrolyte chamber 350 has reached the level of a first level sensor 372. Additionally or alternatively, a hydraulic pressure of the fluid in the first electrolyte chamber may reach a first threshold pressure, which corresponds to the first threshold volume. The first threshold volume may correspond to a first dilution volume of the electrolyte in the first electrolyte chamber. After the fluid volume reaches the first threshold volume, enough dissolution of the dry electrolyte precursor may occur so that circulation and mixing of the fluid in the first electrolyte chamber can be started. In one example, the first threshold volume may include up to 20% of the volume of the first electrolyte chamber. If the first electrolyte chamber volume is not greater than the first threshold volume, then the method may proceed from 518 to 520 to continue flowing water to the first electrolyte chamber without activating the first electrolyte chamber heater and without activating the first electrolyte recirculation pump.

If the first electrolyte chamber volume is greater than or equal to the first threshold volume, then the method may proceed from 518 to 522, where the method includes activating or increasing power supplied to a first electrolyte chamber heater in order to raise a temperature of the fluid in the first electrolyte chamber to a first threshold temperature. By increasing a temperature of the first electrolyte chamber solution, dissolution of the dry electrolyte precursors in the first electrolyte chamber may occur more rapidly. As such, the first threshold temperature may be predetermined based on the solubility of the dry electrolyte precursors; as the solubility increases, the first threshold temperature may decrease, and vice versa. Furthermore, at temperatures lower than the first threshold temperature dissolution may be incomplete or precipitation may occur, which decreases homogeneity and may increase the time consumed by the hydration process, thereby increasing operation costs. In one example, the first threshold temperature may be between 45-65° C.

At 524, the method may include activating an electrolyte recirculation pump fluidly connected to the first electrolyte chamber to recirculate the fluid in the first electrolyte chamber to aid in more homogeneous mixing and heating of the electrolyte fluid and to accelerate salt dissolution. In one example, the electrolyte recirculation pump may refer to an electrolyte pump 30 or 32 fluidly connected to the first electrolyte chamber. In this way, fluid from the first electrolyte chamber may be pumped via the electrolyte recirculation pump in a recirculation loop and returned to the first electrolyte chamber. Accordingly, during hydration of the redox flow battery system, a bypass valve (not shown in FIG. 1), fluidly coupled between the electrolyte recirculation pump discharge and the first electrolyte chamber may be positioned to divert fluid from the pump directly back to the first electrolyte chamber, bypassing the redox flow battery cells 18 of the power module.

At 526, the method may include determining if the first electrolyte chamber fluid volume is greater than the second threshold volume (e.g., an intermediate threshold volume) greater than the first threshold volume. The second threshold volume may correspond to level indicated by a second level sensor (e.g., second level sensor 374) of the first electrolyte chamber. Additionally or alternatively, a hydraulic pressure of the fluid in the second electrolyte chamber may be equal to a second threshold pressure, which corresponds to an intermediate threshold volume of the first electrolyte chamber, between the lower and upper threshold volumes.

If the first electrolyte chamber volume is not greater than or equal to the second threshold volume, then the method may proceed from 526 to 528 to continue flowing water to the first electrolyte chamber with the heater activated. The method continues to monitor a water level of the first electrolyte chamber. If the first electrolyte chamber volume is greater than or equal to the second threshold volume, then stage-wise filling of the first electrolyte chamber is paused, and the method proceeds to 530 from 526 to shut-off flow of filtered water from the filtration system 320 to the second electrolyte chamber 360. Additionally, the first electrolyte recirculation pump is switched off at 532. Although filling and recirculation of the first electrolyte chamber is paused, heating of the first electrolyte chamber is maintained at 534 of 4B. In one example, the fluid temperature of the first electrolyte chamber is maintained at the first threshold temperature. By maintaining the fluid temperature of the first electrolyte chamber at the first threshold temperature, a risk of precipitation in the first electrolyte chamber may be reduced.

Next, hydration of the dry electrolyte precursors in the second electrolyte chamber is initiated, including stage-wise filling and heating thereof. Hydration of the dry electrolyte precursors in the second electrolyte chamber is initiated, including stage-wise filling and heating thereof, may proceed by way of steps 536 through 553, analogously to steps 516 through 534 for the first electrolyte chamber. In this way, hydration and stage-wise filling and heating of both the first and second electrolyte chambers may be started. In the case of an integrated multi-chamber storage tank, stage-wise filling and heating of the first and second electrolyte chambers may facilitate maintaining a pressure difference between the first and second electrolyte chambers less than a threshold pressure difference. Stage-wise filling and heating of the first and second electrolyte chambers may further allow for faster heating and dissolution of the electrolyte since smaller volumes of fluid can be heated and used for dry electrolyte dissolution.

In some embodiments where only one of the first and second electrolyte chambers comprises a heater, both chambers receive a similar amount of water and the chambers are fluidly coupled to heat solutions of each of the respective chambers. The amount of water may be greater than first threshold volume and less than the third threshold volume. In some examples, the amount of water may be substantially equal to the third threshold volume.

Next, at 554, the method includes initiating a first timer. In one example, the first timer tracks a duration of a hold time, the hold time being initiated in response to fluid in the first and second electrolyte chambers reach the second and fourth threshold volumes, respectively. During the hold time, fluid in the first and second electrolyte chambers remain heated to the first and second electrolyte temperatures. Holding the heated fluid in the first and second electrolyte chambers may allow for dissolution of the dry electrolyte precursors loaded to the first and second electrolyte chamber, and for the solutions to equilibrate. Owing to the change in volume due to dissolution, the volume of fluid in the first and second electrolyte chambers may increase during the hold time even though water supply pump 312 is off and additional filtered water is not supplied.

At 556, the method may include determining if the first timer is greater than a threshold time, indicating that the hold time has elapsed. The threshold time may correspond to an empirically predetermined hold time that helps to ensure that electrolytes fluid in the first and second electrolyte chambers are thoroughly heated and mixed and equilibrated. In one example, the threshold time may be 60 minutes or more. If the first timer is not greater than the threshold time, then the method may proceed to 558 from 556 where the method may continue the hold time without supplying water to the first and second electrolyte chambers. The method may continue to monitor a duration of the time delay via the first timer.

If the first timer is greater than the threshold time, then the method may proceed to 560 from 556, where the method may include determining if the first electrolyte chamber fluid volume is greater than a fifth threshold volume, the fifth threshold volume being larger than the second threshold volume. The fifth threshold volume may correspond to level indicated by a third level sensor 376 of the first electrolyte chamber. Additionally or alternatively, a hydraulic pressure of the fluid in the first electrolyte chamber may be equal to a third threshold pressure, which corresponds to a higher threshold volume of the first electrolyte chamber, greater than the lower and intermediate threshold volumes. If the first electrolyte chamber volume is not greater than the fifth threshold volume, then the method may proceed to 562 from 560, where the method may activate the water supply pump 312 supplying water through the filtration system 320. As described above, the water conductivity of the supply water as measured by the conductivity sensor 334 may be continuously monitored by the controller throughout method 500. Thus, at any time during execution of method 500, the flow of supply water may bypass to the drain 394 in response to the measured water conductivity being greater than the threshold conductivity by positioning the bypass valve 336 to the drain 394.

Next, at 564, the method 500 may include positioning the bypass valve 336 and the diverter valve 340 to direct the filtered water into the first electrolyte chamber 350. Following 564, method 500 returns back to 560. Once the fluid volume in the first electrolyte chamber 350 reaches the fifth threshold volume, at 570 the controller may switch off the water supply pump and position the diverter valve 340 to stop flow of filtered water to the first electrolyte chamber, while continuing to maintain the first electrolyte chamber at the first threshold temperature. In this way, stage-wise filling and hydration of the electrolyte within the first electrolyte chamber is achieved.

Following 570, the method may proceed to 572 where the method may include determining if the second electrolyte chamber fluid volume is greater than a sixth threshold volume, the sixth threshold volume being larger than the fourth threshold volume. The sixth threshold volume may correspond to level indicated by a third level sensor 386 of the second electrolyte chamber. Additionally or alternatively, a hydraulic pressure of the fluid in the second electrolyte chamber may be equal to a third threshold pressure, which corresponds to a higher threshold volume of the second electrolyte chamber, greater than the lower and intermediate threshold volumes. If the first electrolyte chamber volume is not greater than the sixth threshold volume, then the method may proceed to 574 from 572, where the method may activate the water supply pump 312 supplying water through the filtration system 320. As described above, the water conductivity of the supply water as measured by the conductivity sensor 334 may be continuously monitored by the controller throughout method 500. Thus, at any time during execution of method 500, the flow of supply water may bypass to the drain 394 in response to the measured water conductivity being greater than the threshold conductivity by positioning the bypass valve 336 to the drain 394.

Next, at 576, the method 500 may include positioning the bypass valve 336 and the diverter valve 340 to direct the filtered water into the second electrolyte chamber 360. Following 576, method 500 returns back to 572. Once the fluid volume in the second electrolyte chamber 350 reaches the sixth threshold volume, at 582 the controller may switch off the water supply pump 312 and position the diverter valve 340 to stop flow of filtered water to the first electrolyte chamber, while continuing to maintain the first electrolyte chamber at the first threshold temperature. In this way, stage-wise filling and hydration of the electrolyte within the second electrolyte chamber is achieved. Following 582, the method may proceed to method 300 after step 410, and ends.

Once stage-wise filling and hydration of both first and second electrolyte chambers is achieved, the redox electrolyte system may be operated, including supplying power to an external load during discharging, receiving power during a charging mode, and operating in an idle mode during which no charging or discharging of the redox flow battery cells occurs.

In this way, a hydration procedure for a redox flow battery includes transporting dry electrolytes stored in tanks and hydrating the electrolytes via a water source at a desired location. The electrolytes are hydrated via a field hydration system configured to filter water from the water source and deliver a desired amount of water to each of the tanks comprising electrolytes. The technical effect of transporting the electrolytes dry and mixing the electrolytes at the desired location is to decrease a shipping cost and complexity of the redox flow battery system, while increasing flexibility in startup and operation logistics of the redox flow battery system.

Thus, a method of operating a redox flow battery system, the redox flow battery system including first and second electrolyte chambers fluidly coupled to a redox flow battery cell, includes during a first condition, including when the redox flow battery system is in a dry state without water and liquid solvents, adding first and second amounts of dry electrolyte precursor to the first and second electrolyte chambers, respectively, the first and second amounts corresponding to a desired concentration of first and second electrolytes in the first and second electrolyte chambers during an operating mode, including when the redox flow battery system is being charged or discharged, fluidly coupling the redox flow battery system to a field hydration system, the field hydration system including a water supply pump fluidly coupled to a water source, and supplying water from the field hydration system to the redox flow battery system, wherein the redox flow battery system would remain in the dry state without the water from the field hydration system. A first example of the method includes during a second condition, including when the redox flow battery system is in a wet state with greater than a threshold amount of water therein, directing the water to the first electrolyte chamber, and in response to a first electrolyte chamber liquid level reaching a first threshold level, raising a temperature of the first electrolyte chamber to a first threshold temperature, the first threshold temperature being greater than an ambient temperature. A second example of the method optionally includes the first example and further includes stopping the supply of water from the field hydration system to the redox flow battery system in response to a conductivity of the supplied water increasing above a threshold conductivity. A third example of the method optionally includes one or more of the first and second examples and further includes during the second condition, in response to the first electrolyte chamber liquid level reaching the first threshold level, recirculating the first electrolyte chamber liquid level with a circulation pump fluidly coupled to the first electrolyte chamber. A fourth example of the method optionally includes one or more of the first through third examples and further includes during the second condition, in response to the first electrolyte chamber liquid level reaching a second threshold level, stopping the supply of water to the first electrolyte chamber and deactivating the circulation pump, wherein the second threshold level is higher than the first threshold level. A fifth example of the method optionally includes one or more of the first through fourth examples and further includes during the second condition, in response to the first electrolyte chamber liquid level reaching the second threshold level, directing water to the second electrolyte chamber, the second electrolyte chamber being in the dry state prior to the first electrolyte chamber liquid level reaching the second threshold level. A sixth example of the method optionally includes one or more of the first through fifth examples and further includes wherein the redox flow battery system comprises a multi-chamber storage tank, the multi-chamber storage tank including the first and second electrolyte chambers, and the supply of water to the first electrolyte chamber is stopped until a second electrolyte chamber liquid level reaches the second threshold level. A seventh example of the method optionally includes one or more of the first through sixth examples and further includes maintaining a pressure difference between the first and second electrolyte chambers less than a threshold pressure difference. An eighth example of the method optionally includes one or more of the first through seventh examples and further includes during the second condition, in response to a second electrolyte chamber liquid level reaching a third threshold level, raising a temperature of the second electrolyte chamber to a second threshold temperature the second threshold temperature being greater than the ambient temperature. A ninth example of the method optionally includes one or more of the first through eighth examples and further includes during the second condition, in response to the second electrolyte chamber liquid level reaching a fourth threshold level, stopping the supply of water to the second electrolyte chamber, wherein the fourth threshold level is greater than the third threshold level. A tenth example of the method optionally includes one or more of the first through ninth examples and further includes during the second condition, in response to the second electrolyte chamber liquid level reaching the fourth threshold level, maintaining the first and second electrolyte chambers at the first and second threshold temperatures for a threshold duration. An eleventh example of the method optionally includes one or more of the first through tenth examples and further includes in response to the threshold duration expiring, filling the first and second electrolyte chambers with the water. A twelfth example of the method optionally includes one or more of the first through eleventh examples and further includes during the first condition, prior to coupling the redox flow battery system to the field hydration system, assembling the redox flow battery system and transporting the assembled redox flow battery system from a battery manufacturing facility to an end-use location different from the battery manufacturing facility. A thirteenth example of the method optionally includes one or more of the first through twelfth examples and further includes wherein the second condition further comprises fluidly coupling the redox flow battery system to a field hydration system at the end-use location.

Thus, a redox flow battery system includes a redox flow battery cell fluidly coupled to positive and negative electrolyte chambers, dry electrolytes located in the positive and negative electrolyte chambers with less than a threshold amount of solvents, a field hydration system detachably coupled to a water source arranged externally to the redox flow battery, and a controller, including executable instructions stored thereon to, activate a water supply pump of the field hydration system configured to flow water from the water source to the positive and negative electrolyte chambers. A first example of the redox flow battery system includes wherein the field hydration system comprises a diverter valve and a bypass valve, wherein the executable instructions further comprise opening the bypass valve and closing the diverter valve in response to a water conductivity being greater than a threshold conductivity, where flowing water through the open bypass valve includes flowing water out of the field hydration system and away from the positive and negative electrolyte chambers. A second example of the redox flow battery system optionally includes the first example and further includes a conductivity sensor positioned downstream of a filtration system, the conductivity sensor and the filtration system fluidly interposed between the water supply pump and the diverter valve, wherein the filtration system comprises two or more filters divided into two or more filter banks. A third example of the redox flow battery system optionally includes one or more of the first and second examples and further includes wherein the executable instructions further comprise instructions opening the diverter valve and closing the bypass valve in response to a water conductivity measured by the conductivity sensor being less than the threshold conductivity, and wherein flowing water through the open diverter valve includes flowing water to one or more of the positive and negative electrolyte chambers. A fourth example of the redox flow battery system optionally includes one or more of the first through third examples and further includes wherein the executable instructions further comprise charging the redox flow battery system in response to decoupling the field hydration system from the redox flow battery.

Thus, a redox flow battery system may include first and second electrolyte chambers fluidly coupled to a redox flow battery cell, and a controller with executable instructions stored in non-transitory memory thereon to, during a first condition, including when the redox flow battery system is in a dry state without water and liquid solvents, add first and second amounts of dry electrolyte precursor to the first and second electrolyte chambers, respectively, the first and second amounts corresponding to a desired concentration of first and second electrolytes in the first and second electrolyte chambers during an operating mode, including when the redox flow battery system is being charged or discharged, fluidly couple the redox flow battery system to a field hydration system, the field hydration system including a water supply pump fluidly coupled to a water source, and supply water from the field hydration system to the redox flow battery system, wherein the redox flow battery system would remain in the dry state without the water from the field hydration system.

Note that the example control and estimation routines included herein can be used with various battery configurations. The control methods and routines disclosed herein may be stored as executable instructions in non-transitory memory and may be carried out by the control system including the controller in combination with the various sensors, actuators, and other battery hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various battery hardware components in combination with the electronic controller.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of operating a redox flow battery system, the redox flow battery system including first and second electrolyte chambers fluidly coupled to a redox flow battery cell, the method comprising:
   during a first condition as determined by a controller, including when the redox flow battery system is in a dry state without water and liquid solvents,
      adding first and second amounts of dry electrolyte precursor to the first and second electrolyte chambers, respectively, the first and second amounts corresponding to a desired concentration of first and second electrolytes in the first and second electrolyte chambers during an operating mode, including when the redox flow battery system is being charged or discharged,
      fluidly coupling the redox flow battery system to a field hydration system, the field hydration system detachably fluidly coupled to the first and second electrolyte chambers of the redox flow battery system and including a water supply pump detachably fluidly coupled to a water source,
      supplying water from the field hydration system to the redox flow battery system, wherein the redox flow battery system would remain in the dry state without the water from the field hydration system,
      stopping, via the controller of the redox flow battery system controlling one or more actuators, a supply of water from the field hydration system to the redox flow battery system in response to a conductivity of the supplied water increasing above a threshold conductivity as determined by the controller, the conductivity determined using signals received from a conductivity sensor of the field hydration system, and
      operating the redox flow battery system, wherein operating the redox flow battery system includes both charging and discharging via oxidation and reduction of the first and second electrolytes; and
   during a second condition as determined by the controller, including when the redox flow battery system is in a wet state with greater than a threshold amount of water therein,
      directing, via the controller, the water to the first electrolyte chamber, and in response to a first electrolyte chamber liquid level reaching a first threshold level as determined by the controller and before operating the redox flow battery, raising a temperature of the first electrolyte chamber to a first threshold temperature via the controller, the first threshold temperature being greater than an ambient temperature, and in response to the first electrolyte chamber liquid level reaching the first threshold level as determined by the controller, recirculating, via the controller controlling the one or more actuators, the first electrolyte with a circulation pump fluidly coupled to the first electrolyte chamber, and in response to the first electrolyte chamber liquid level reaching a second threshold level as determined by the controller, stopping, via the controller controlling the one or more actuators, the supply of water to the first electrolyte chamber and deactivating, via the controller, the circulation pump, wherein the second threshold level is higher than the first threshold level and lower than an upper threshold level of the first electrolyte chamber.

2. The method of claim 1, wherein the field hydration system is detachably fluidly coupleable to the redox flow battery system by way of one or more inlets and outlets to and from the first and second electrolyte chambers, each of the first and second electrolyte chambers comprising negative and positive electrolyte chambers, respectively, wherein the field hydration system comprises one or more components configured to prepare electrolytes for both positive and negative terminals of the redox flow battery, the one or more components including the water supply pump for supplying water from a supply source, a filtration system, and bypass and diverter valves for directing water to drain and to the negative and positive electrolyte chambers, wherein the redox flow battery system is configured to be dry-assembled at a battery manufacturing facility different from an end-use location without filling and hydrating the redox flow battery system before delivery of the redox flow battery system to the end-use location, wherein the end-use location corresponds to a location where the redox flow battery system is to be installed and utilized as a fixed location, non-portable, on-site energy storage, and wherein the field hydration system permits automated and controlled hydration of the redox flow battery system once in the end-use location.

3. The method of claim 1, further comprising, during the second condition as determined by the controller, in response to the first electrolyte chamber liquid level reaching the second threshold level as determined by the controller, directing, via the controller, water to the second electrolyte chamber, the second electrolyte chamber being in the dry state prior to the first electrolyte chamber liquid level reaching the second threshold level.

4. The method of claim 3, wherein:
the redox flow battery system comprises a multi-chamber storage tank,
the multi-chamber storage tank including the first and second electrolyte chambers, and
the supply of water to the first electrolyte chamber is stopped, via the controller, until a second electrolyte chamber liquid level reaches a fill height of the multi-chamber storage tank, as determined by the controller, that is even with the second threshold level of the first electrolyte chamber.

5. The method of claim 4, further comprising maintaining, via the controller, a pressure difference between the first and second electrolyte chambers less than a threshold pressure difference as determined by the controller.

6. The method of claim 3, further comprising, during the second condition as determined by the controller, in response to a second electrolyte chamber liquid level reaching a third threshold level as determined by the controller and before operating the redox flow battery, raising, via the controller, a temperature of the second electrolyte chamber to a second threshold temperature as determined by the controller, the second threshold temperature being greater than the ambient temperature.

7. The method of claim 6, further comprising, during the second condition as determined by the controller, in response to the second electrolyte chamber liquid level reaching a fourth threshold level as determined by the controller, stopping, via the controller controlling the one or more actuators, the supply of water to the second electrolyte chamber, wherein the fourth threshold level is greater than the third threshold level and less than an upper threshold level of the second electrolyte chamber.

8. The method of claim 7, further comprising, during the second condition as determined by the controller, in response to the second electrolyte chamber liquid level reaching the fourth threshold level as determined by the controller, and before operating the redox flow battery, maintaining, via the controller, the first and second electrolyte chambers at the first and second threshold temperatures for a threshold duration, where the threshold duration is determined by the controller.

9. The method of claim 8, further comprising, in response to the threshold duration expiring as determined by the controller, filling to the respective upper threshold levels, via the controller controlling the one or more actuators, the first and second electrolyte chambers with the water.

10. The method of claim 1, further comprising, during the first condition, prior to coupling the redox flow battery system to the field hydration system, assembling the redox flow battery system and transporting the assembled redox flow battery system from a battery manufacturing facility to an end-use location different from the battery manufacturing facility.

11. The method of claim 10, wherein fluidly coupling the redox flow battery system to the field hydration system is performed at the end-use location.

12. A redox flow battery system, comprising:
a field hydration system that is separate from the redox flow battery system and detachably fluidly coupleable to positive and negative electrolyte chambers of the redox flow battery system, the field hydration system comprising a water supply pump, a diverter valve, a bypass valve, and a conductivity sensor;
a redox flow battery cell fluidly coupled to the positive and negative electrolyte chambers;
dry electrolytes located in the positive and negative electrolyte chambers with less than a threshold amount of solvents;
the field hydration system detachably fluidly coupleable to a water source arranged externally to the redox flow battery; and
a controller, including executable instructions stored thereon to,
activate the water supply pump of the field hydration system configured to flow water from the water source to the positive and negative electrolyte chambers;
open the bypass valve and close the diverter valve in response to a water conductivity being greater than a threshold conductivity to flow water through the open bypass valve, where flowing water through the open bypass valve includes flowing water out of the field hydration system and away from the positive and negative electrolyte chambers, the water conductivity determined by the controller based on signals received from the conductivity sensor; and charge and discharge the redox flow battery cell during operation, wherein the field hydration system is detachably fluidly coupleable to the redox flow battery system by way of one or more inlets and outlets to and from the positive and negative electrolyte chambers, wherein the field hydration system comprises one or more components configured to prepare electrolytes for both positive and negative terminals of the redox flow battery, the one or more components including the water supply pump for supplying water from the water source, a filtration system, and bypass and diverter valves for directing water to drain and to the negative and positive electrolyte chambers, wherein the redox flow battery system is configured to be dry-assembled at a battery manufacturing facility different from an end-use location without filling and hydrating the redox flow battery system before delivery of the redox flow battery system to the end-use location, wherein the end-use location corresponds to a location where the redox flow battery system is to be installed and utilized as a fixed location, non-portable, on-site energy storage, and wherein the field hydration system permits automated and controlled hydration of the redox flow battery system once in the end-use location.

13. The system of claim 12, wherein the conductivity sensor is positioned downstream of a filtration system, the conductivity sensor and the filtration system fluidly interposed between the water supply pump and the diverter valve, wherein the filtration system comprises two or more filters divided into two or more filter banks.

14. The system of claim 13, wherein the executable instructions further comprise instructions opening the diverter valve and closing the bypass valve in response to the water conductivity measured by the conductivity sensor being less than the threshold conductivity, and wherein flowing water through the open diverter valve includes flowing water to one or more of the positive and negative electrolyte chambers.

15. The system of claim 14, wherein the executable instructions further comprise charging the redox flow battery system in response to decoupling the field hydration system from the redox flow battery.

16. The method of claim 9, wherein the field hydration system is coupled to the first and second electrolyte chambers and water is added to the first and second electrolyte chambers by the field hydration system in three stages:

a first stage where the water is added by the field hydration system to reach a first and third threshold liquid levels in the first and second electrolyte chambers respectively, after which the liquid in the electrolyte chambers is brought to the threshold temperature by a heater and circulated;

a second stage where water is added by the field hydration system to reach the second and fourth threshold levels in the first and second electrolyte chambers respectively, after which no water is added to either the first or second electrolyte chambers for the threshold duration of time; and a third stage where water is added by the field hydration system to reach the upper threshold limits of each of the first and second electrolyte chambers, after which the field hydration system is decoupled from the first and second electrolyte chambers and the redox flow battery is operated.

* * * * *